(12) United States Patent
Jo et al.

(10) Patent No.: US 10,252,706 B2
(45) Date of Patent: Apr. 9, 2019

(54) MASTER CYLINDER FOR VEHICLE

(71) Applicant: erae AMS Co., Ltd., Daegu (KR)

(72) Inventors: Ju-Hyung Jo, Daegu (KR);
Dong-Hyun Lee, Daegu (KR)

(73) Assignee: ERAE AMS CO., LTD., Daegu (KR)

( * ) Notice: Subject to any disclaimer, the term of this patent is extended or adjusted under 35 U.S.C. 154(b) by 11 days.

(21) Appl. No.: 15/529,630

(22) PCT Filed: Nov. 23, 2015

(86) PCT No.: PCT/KR2015/012573
§ 371 (c)(1),
(2) Date: May 25, 2017

(87) PCT Pub. No.: WO2016/085209
PCT Pub. Date: Jun. 2, 2016

(65) Prior Publication Data
US 2017/0274881 A1    Sep. 28, 2017

(30) Foreign Application Priority Data
Nov. 28, 2014  (KR) .......................... 10-2014-0168413

(51) Int. Cl.
*B60T 11/236*    (2006.01)
*B60T 11/16*     (2006.01)

(52) U.S. Cl.
CPC ............. *B60T 11/236* (2013.01); *B60T 11/16* (2013.01)

(58) Field of Classification Search
CPC ..................................................... F15B 11/263
USPC ........................................................... 60/588
See application file for complete search history.

(56) References Cited

U.S. PATENT DOCUMENTS

| 7,040,093 B2 | 5/2006 | Legret et al. |
| 8,407,996 B2 * | 4/2013 | Aoki ................. B60T 11/236 60/588 |
| 2016/0200304 A1 * | 7/2016 | Owada .................. F16J 15/164 60/585 |

FOREIGN PATENT DOCUMENTS

| CN | 1777529 A | 5/2006 |
| JP | 2008-105444 A | 5/2008 |
| KR | 10-2010-0023672 A | 3/2010 |
| KR | 10-2010-0040361 A | 4/2010 |
| WO | 2012-146337 A1 | 11/2012 |

* cited by examiner

*Primary Examiner* — Michael Leslie
(74) *Attorney, Agent, or Firm* — Novick, Kim & Lee, PLLC; Jae Youn Kim

(57) ABSTRACT

A master cylinder includes: a cylinder housing; a piston which is movably disposed in the cylinder housing so as to form a pressure chamber and a hydraulic fluid supplying chamber; and a sealing member which is interposed between the cylinder housing and the piston. An indentation portion is provided on an outer circumferential surface of the piston, wherein a rear wall of the indentation portion is formed as a slanted surface. A plurality of first communication holes are formed on a bottom surface of the indentation portion and a second communication hole is formed on the rear wall of the indentation portion.

3 Claims, 3 Drawing Sheets

MASTER CYLINDER FOR VEHICLE

CROSS-REFERENCE TO RELATED APPLICATION

This application claims priority to and the benefit of Korean Patent Application No. 10-2014-0168413 filed in the Korean Intellectual Property Office on Nov. 28, 2014, the entire contents of which are incorporated herein by reference.

TECHNICAL FIELD

The present invention relates to a master cylinder of a vehicle.

BACKGROUND ART

A master cylinder is a device for generating hydraulic power in a hydraulic brake system.

A master cylinder includes a cylinder housing and a piston which is movably disposed in the cylinder housing. Further, a sealing member which is installed in an inner surface of the housing is provided, and the piston is provided with a communication hole. The sealing member has a cup shape and is also called a cup seal.

The cylinder housing and the piston forms cooperatively a pressure chamber for generating hydraulic pressure in a side in a direction of forward movement of the piston, and a hydraulic supplying chamber which communicates with a reservoir is formed between the cylinder housing and an outer surface of the piston. The sealing member partitions the hydraulic supplying chamber and the pressure chamber.

In a prior art, a communication hole for connecting the pressure chamber and the hydraulic supplying chamber is formed in the piston, and communications holes are respectively formed at a front side and a rear side, the front communication hole acting as a passageway for pressure generation and the rear communication hole acting as a passageway for preventing drag. At this time, an indentation portion is formed at an outer circumferential surface of the piston, and a front wall and a rear wall of the indentation portion are respectively formed as a slanted surface, a portion between the front wall and the rear wall being formed in a planar surface parallel with a longitudinal direction of the cylinder, and the two communication holes being formed in the planar surface. In this case, there is a problem in that the sealing member may contact a portion which forms an entrance of a passageway so as to be damaged.

DETAILED DESCRIPTION OF THE INVENTION

Technical Problem

The present invention has been made in an effort to provide a master cylinder having a communication hole which may reduce damages on the sealing member thereof.

Technical Solution

A master cylinder according to an exemplary embodiment of the present invention includes: a cylinder housing; a piston which is movably disposed in the cylinder housing so as to form a pressure chamber and a hydraulic fluid supplying chamber; and a sealing member which is interposed between the cylinder housing and the piston. An indentation portion is provided on an outer circumferential surface of the piston. A plurality of first communication holes are formed on a bottom surface of the indentation portion and a second communication hole is formed on the rear wall of the indentation portion.

The bottom surface of the indentation portion may be formed to be parallel with a longitudinal direction of the piston.

The plurality of the first communication holes may be radially disposed on a planar surface perpendicular to a longitudinal direction of the piston.

The first communication hole and the second communication hole may have the same diameter.

Advantageous Effects

According to the present invention, since the second communication holes which act as drag prevention passageway are formed on the rear walls which are slanted surfaces, an angle with which the sealing members collide with the edges of the second communication holes is reduced, so the damage of the sealing members can be reduced.

DETAILED DESCRIPTION OF THE EMBODIMENTS

Embodiments of the present invention will be described in detail with reference to the accompanying drawings hereinafter.

Figure 1:
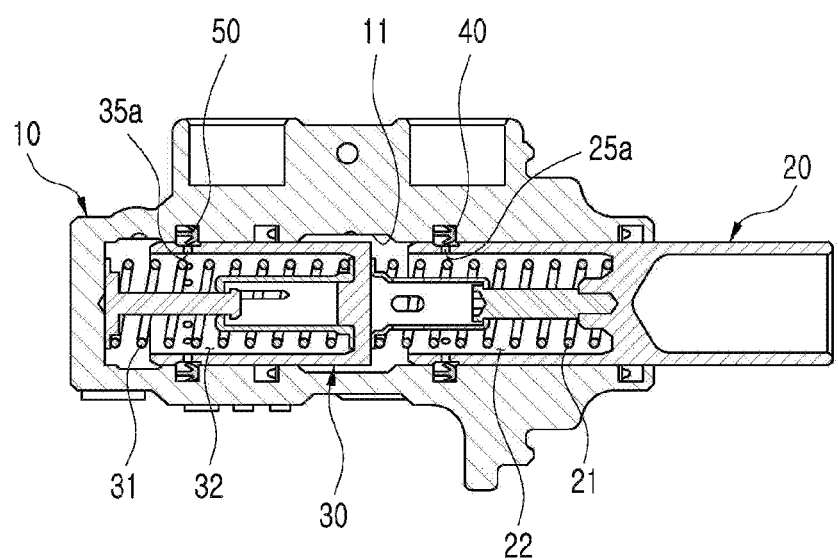
FIG. 1 is a sectional view of a master cylinder according to an embodiment of the present invention.

Referring to FIG. 1, a master cylinder includes a cylinder housing 10 and a first piston 20 and a second piston 30 which are respectively disposed therein to be movable forward and rearward. In detail, the cylinder housing 10 defines a bore 11 which is extended in a longitudinal direction thereof, and the first piston 20 and the second piston 30 are movably disposed in the bore 11. Meanwhile, not shown in the drawings, the master cylinder may be connected to a hydraulic fluid reservoir (not shown) so as to be supplied with hydraulic fluid.

The first piston 20 is elastically supported against the second piston 30 by a first resilient spring 21, and the second piston 30 is elastically supported against the cylinder housing 10 by a second resilient spring 31.

A first pressure chamber 22 is formed between the first piston 20 and the second piston 30, and a second pressure chamber 32 is formed between the second piston 30 and a frontal wall of the cylinder housing 10. The fluid (e.g., hydraulic oil) pressurized in the first and the second pressure chambers 22 and 23 may be respectively supplied to brake driving cylinders (not shown) via fluid discharging passages.

Hydraulic fluid supplying chambers 23 and 33 are respectively formed between outer circumferential surfaces of the first piston 20 and the second piston 30 and an inner circumferential surface of the cylinder housing 10. The hydraulic fluid supplying chambers 23 and 33 are respectively connected to the hydraulic fluid reservoir via fluid passages. Accordingly, the hydraulic fluid of the hydraulic fluid reservoir may be supplied to the hydraulic fluid supplying chambers 22 and 23 via the fluid passages.

A first sealing member 40 and a second sealing member 50 are respectively interposed between the first piston 20 and the second piston 30 and an inner circumferential surface of the cylinder housing 10. For example, the first sealing member 40 and the second sealing member 50 may be disposed in grooves which are respectively formed on an inner circumferential surface of the cylinder housing 10. The first sealing member 40 and the second sealing member 50 contact both the inner circumferential surface of the cylinder housing 10 and the outer circumferential surfaces of the first piston 20 and the second piston 30 so as to partition the hydraulic fluid supplying chambers 23 and 33 and the pressure chambers 22 and 32.

Figure 2:
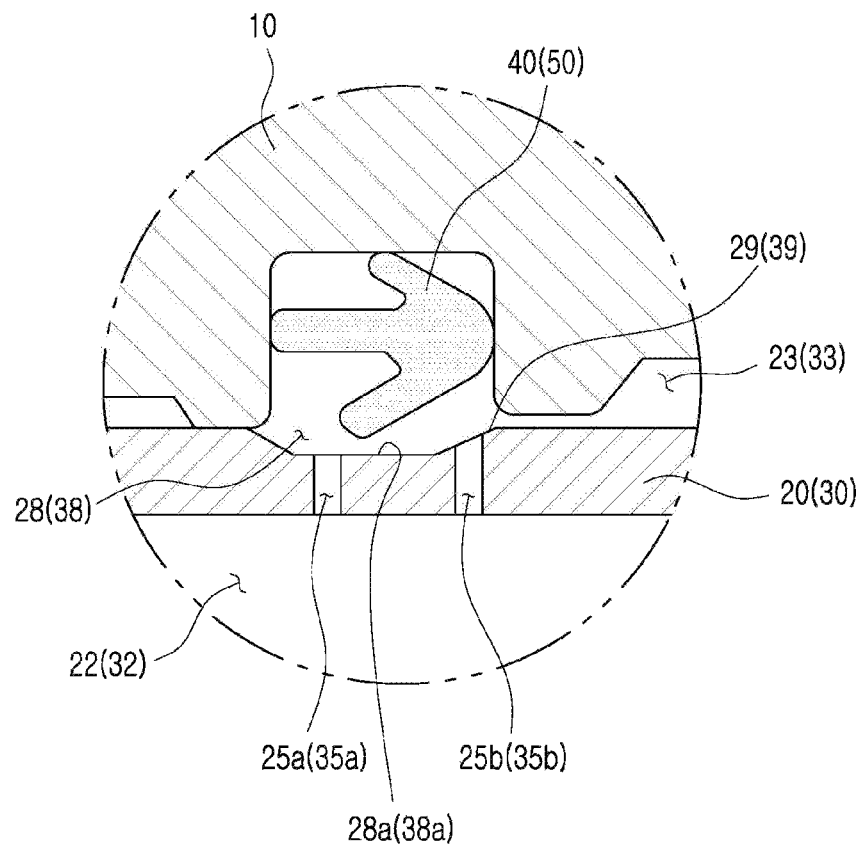
FIG. 2 is a partial enlarged view of a master cylinder according to an embodiment of the present invention.
Figure 3:
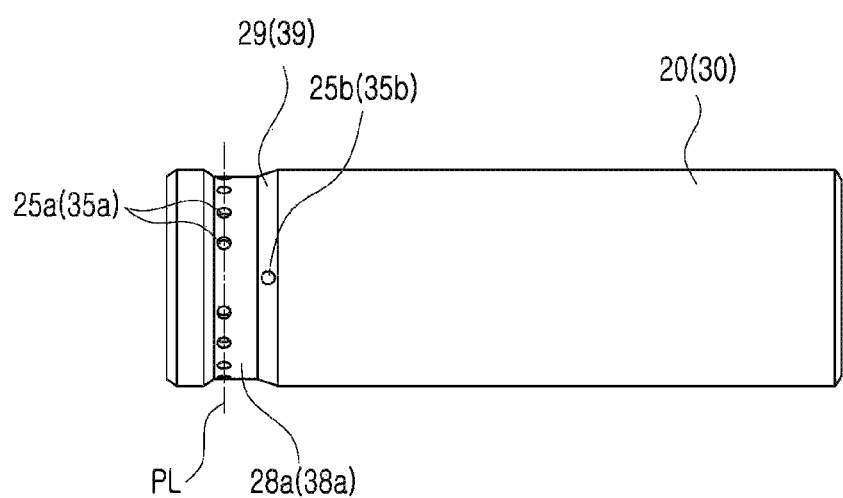
FIG. 3 is a drawing showing a piston of a master cylinder according to an embodiment of the present invention.

Referring to FIG. 2 and FIG. 3, indentation portions 28 and 38 are respectively provided on the outer circumferential surfaces 27 and 37 of the pistons 20 and 30. As exemplarily shown in FIG. 2, the indentation portions 28 and 38 may be formed at positions approximately facing the sealing members 40 and 50. At this time, rear walls 29 and 39 of the indentation portions 28 and 38 may be formed as slanted surfaces. Here, the slanted surface means that the surface is formed to have an angle with respect to a direction perpendicular to a longitudinal direction of the piston. As shown in the drawings, the slanted surface may be formed such that an outer end thereof in a radial direction is positioned toward a rear side of the master cylinder (right direction in FIG. 2 and FIG. 3).

Communication holes 25a, 25b, 35a and 35b for connecting the pressure chambers 22 and 32 and the hydraulic fluid supplying chambers 23 and 33 are provided.

The communication holes 25a, 25b, 35a and 35b may be formed at the indentation portions 28 and 38. In detail, the first communication holes 25a and 35a may be formed at bottom surfaces 28a and 38a of the indentation portions 28 and 38, and the second communication holes 25b and 35b may be formed at the rear walls 29 and 39 of the indentation portions 28 and 38. The bottom surfaces 28a and 38a of the indentation portions 28 and 38 may be formed to be parallel with a longitudinal direction of the piston.

At this time, the first communication holes 25a and 35a may respectively be in a plurality. For example, the fifteen first communication holes 25a and one second communication hole 25b may be provided in the first piston 20, and the fifteen first communication holes 35a and one second communication hole 35 be may be provided in the second piston 30. The first communication holes and 25a and 35a and the second communication holes 25b and 35b may have the same diameter. The first communication holes 25a and 35a act as pressure generating passageways, and the second communication holes 25b and 35b act as drag preventing passageways.

Meanwhile, as shown in FIG. 3, the first communication holes 25a and 35a may be radially disposed on a surface PL perpendicular to a longitudinal direction of the piston, and the second communication holes 25b and 35b may be formed on the rear walls 29 and 39 in a state of being spaced in a rearward therefrom.

Since the second communication holes 25b and 35b which act as drag prevention passageway are formed on the rear walls 29 and 39 which are slanted surfaces, an angle with which the sealing members 40 and 50 collide with the edges of the second communication holes 25b and 35b is reduced, so the damage of the sealing members 40 and 50 can be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention relates to a master cylinder of a vehicle and it can be applied to a vehicle, so the present invention has an industrial applicability.

The invention claimed is:

1. A master cylinder comprising:
  a cylinder housing;
  a piston which is movably disposed in the cylinder housing, the piston having a pressure chamber within the piston and a hydraulic fluid supplying chamber outside the piston; and
  a sealing member which is interposed between the cylinder housing and the piston,
  wherein an indentation portion is disposed on an outer circumferential surface of the piston,
  wherein the indentation portion has a bottom surface parallel with a longitudinal direction of the piston,
  wherein a rear wall of the indentation portion has a slanted surface, and
  wherein one or more first communication holes are disposed on the bottom surface of the indentation portion and one or more second communication holes are disposed on the slanted surface of the rear wall of the indentation portion.

2. The master cylinder of claim 1, wherein the one or more first communication holes are radially disposed on a planar surface perpendicular to the longitudinal direction of the piston.

3. The master cylinder of claim 1, wherein each of the one or more first communication holes and each of the one or more second communication holes have a same diameter.

* * * * *